(12) United States Patent
Bosch et al.

(10) Patent No.: US 9,446,734 B2
(45) Date of Patent: Sep. 20, 2016

(54) ILLUMINATED EMBLEM ASSEMBLY FOR CONNECTION TO AN AIRBAG COVER

(71) Applicants: TK Holdings Inc., Auburn Hills, MI (US); TASUS Canada Corporation, Hamilton, Ontario (CA)

(72) Inventors: Jerome Bosch, Romeo, MI (US); Vaughn Pipe, Hamilton (CA)

(73) Assignees: TASUS Canada Corporation, Hamilton, Ontario (CA); TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 14/589,362

(22) Filed: Jan. 5, 2015

(65) Prior Publication Data

US 2015/0108742 A1 Apr. 23, 2015

Related U.S. Application Data

(63) Continuation of application No. 14/167,178, filed on Jan. 29, 2014, now Pat. No. 8,925,959.

(60) Provisional application No. 61/757,881, filed on Jan. 29, 2013.

(51) Int. Cl.
*B60R 21/203* (2006.01)
*B60R 21/215* (2011.01)
(Continued)

(52) U.S. Cl.
CPC ............. *B60R 21/215* (2013.01); *B60Q 3/004* (2013.01); *B60Q 3/024* (2013.01); *B60R 21/203* (2013.01); *B60R 2021/21543* (2013.01)

(58) Field of Classification Search
CPC .................. B60R 13/005; B60R 2021/21543; B60R 21/203; B60R 21/215; B60Q 3/004; B60Q 3/024

USPC .......................... 280/728.3, 728.2, 731, 732; 40/542–544, 564, 591, 593
See application file for complete search history.

(56) References Cited

U.S. PATENT DOCUMENTS 3,200,524 A 8/1965 Hendrickson
4,443,832 A 4/1984 Kanamori et al.
(Continued)

FOREIGN PATENT DOCUMENTS

EP 1973767 2/2011
JP 2009/096450 5/2009
(Continued)

OTHER PUBLICATIONS

International Search Report and Written Opinion, dated May 15, 2014, in International Application No. PCT/US2014/013582 (13 pages).

(Continued)

*Primary Examiner* — Laura Freedman
(74) *Attorney, Agent, or Firm* — Meunier Carlin & Curfman LLC

(57) ABSTRACT

Multi-piece constructions for an illuminated emblem assembly for connection to an airbag cover are provided herein. An airbag assembly can include an airbag cover, an emblem portion having one or more translucent areas and an illumination source. The illumination source can include a light guide and one or more light emitting diodes (LEDs) for illuminating the light guide. The light guide can include an illuminated portion for transmitting light emitted from the one or more LEDs. The emblem portion can be arranged between the airbag cover and the illumination source, and the emblem portion and the illumination source can be aligned such that at least one of the one or more translucent areas is illuminated by light passing through the emblem portion from the illuminated portion.

18 Claims, 8 Drawing Sheets

(51) Int. Cl.
*B60Q 3/02* (2006.01)
*B60Q 3/00* (2006.01)

(56) References Cited

U.S. PATENT DOCUMENTS

| | | | |
|---|---|---|---|
| 5,203,226 A | 4/1993 | Hongou et al. | |
| 5,516,143 A | 5/1996 | Lang et al. | |
| 5,549,323 A | 8/1996 | Davis | |
| 5,558,364 A | 9/1996 | Davis | |
| 5,678,851 A | 10/1997 | Saito et al. | |
| 5,851,022 A | 12/1998 | Yamamoto et al. | |
| 5,895,115 A | 4/1999 | Parker et al. | |
| 6,053,526 A | 4/2000 | Preisler et al. | |
| 6,062,595 A | 5/2000 | Ha | |
| 6,099,027 A | 8/2000 | Shirk et al. | |
| 6,190,026 B1 | 2/2001 | Moore | |
| 6,465,951 B1* | 10/2002 | Krafcik et al. | 313/512 |
| 6,530,592 B2 | 3/2003 | Derrick et al. | |
| 6,546,659 B1 | 4/2003 | Imai et al. | |
| 6,568,704 B2 | 5/2003 | Iida et al. | |
| 6,652,128 B2 | 11/2003 | Misaras | |
| 6,760,989 B2 | 7/2004 | Peterson et al. | |
| 6,889,456 B2 | 5/2005 | Shibata et al. | |
| 7,213,833 B2 | 5/2007 | Amamori | |
| 7,234,725 B2 | 6/2007 | Welford | |
| 7,387,397 B2 | 6/2008 | Konet et al. | |
| 7,441,801 B2 | 10/2008 | Nakamura et al. | |
| 7,520,528 B2 | 4/2009 | Nakamura et al. | |
| 7,594,852 B2* | 9/2009 | Rasmussen | 463/20 |
| 7,712,933 B2 | 5/2010 | Fleischmann et al. | |
| 7,866,858 B2 | 1/2011 | Hirzmann | |
| 7,887,088 B2 | 2/2011 | Worrell et al. | |
| 7,891,699 B2 | 2/2011 | Worrell et al. | |
| 7,989,725 B2* | 8/2011 | Boddie et al. | 200/600 |
| 8,018,139 B2* | 9/2011 | Chou | 313/503 |
| 8,061,861 B2 | 11/2011 | Paxton et al. | |
| 8,210,564 B2 | 7/2012 | Helmstetter et al. | |
| 8,210,565 B2 | 7/2012 | Hayashi | |
| 8,267,422 B2 | 9/2012 | Sauer et al. | |
| 8,459,713 B2 | 6/2013 | Sella et al. | |
| 8,585,082 B2 | 11/2013 | Yamaji | |
| 8,783,132 B2 | 7/2014 | Neumann et al. | |
| 8,816,586 B2* | 8/2014 | Marcove et al. | 315/77 |
| 8,925,959 B2* | 1/2015 | Bosch et al. | 280/728.3 |
| 8,944,620 B2* | 2/2015 | Miles et al. | 362/85 |
| 8,960,356 B2* | 2/2015 | Momen | 180/271 |
| 9,067,556 B2* | 6/2015 | Bosch | B60R 21/203 |
| 9,168,877 B2* | 10/2015 | Onohara | B60R 21/203 |
| 2003/0209889 A1 | 11/2003 | Erwin et al. | |
| 2007/0104897 A1 | 5/2007 | Oba et al. | |
| 2008/0090031 A1 | 4/2008 | Hirzmann | |
| 2009/0121459 A1 | 5/2009 | Bostick et al. | |
| 2009/0273165 A1 | 11/2009 | Worrell et al. | |
| 2010/0102538 A1 | 4/2010 | Paxton et al. | |
| 2010/0104780 A1 | 4/2010 | Paxton et al. | |
| 2010/0186214 A1* | 7/2010 | Judge | 29/445 |
| 2010/0194080 A1 | 8/2010 | Paxton et al. | |
| 2011/0116251 A1 | 5/2011 | Rick | |
| 2014/0210191 A1 | 7/2014 | Bosch et al. | |
| 2015/0239417 A1* | 8/2015 | Kawabe | B60R 21/203 280/728.2 |

FOREIGN PATENT DOCUMENTS

| | | |
|---|---|---|
| WO | 2007/084031 | 7/2007 |
| WO | 2010/051090 | 5/2010 |
| WO | 2010/087931 | 8/2010 |
| WO | 2014/120757 | 8/2014 |

OTHER PUBLICATIONS

International Search Report and Written Opinion, dated May 14, 2014, in corresponding International Application No. PCT/US2014/013559 (12 pages).

International Preliminary Report on Patentability dated Aug. 4, 2015 from related PCT Application No. PCT/US2014/013582, 9 pages.

International Preliminary Report on Patentability dated Aug. 4, 2015 from related PCT Application No. PCT/US2014/013559, 9 pages.

* cited by examiner

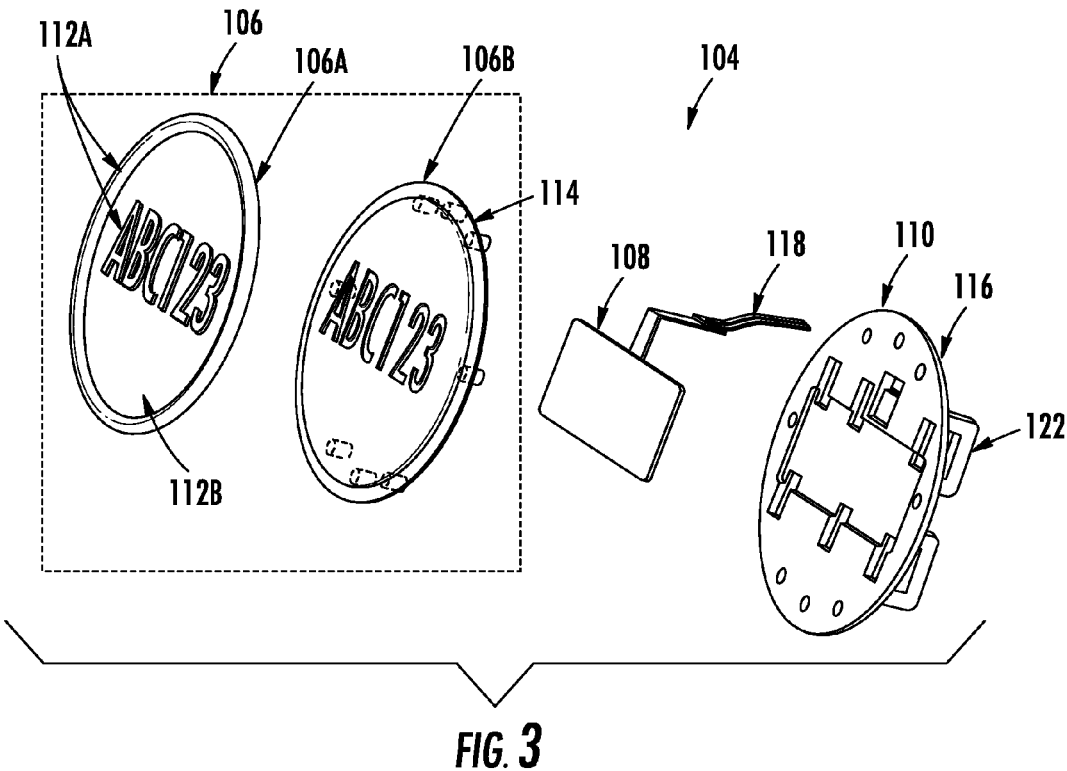
FIG. 3
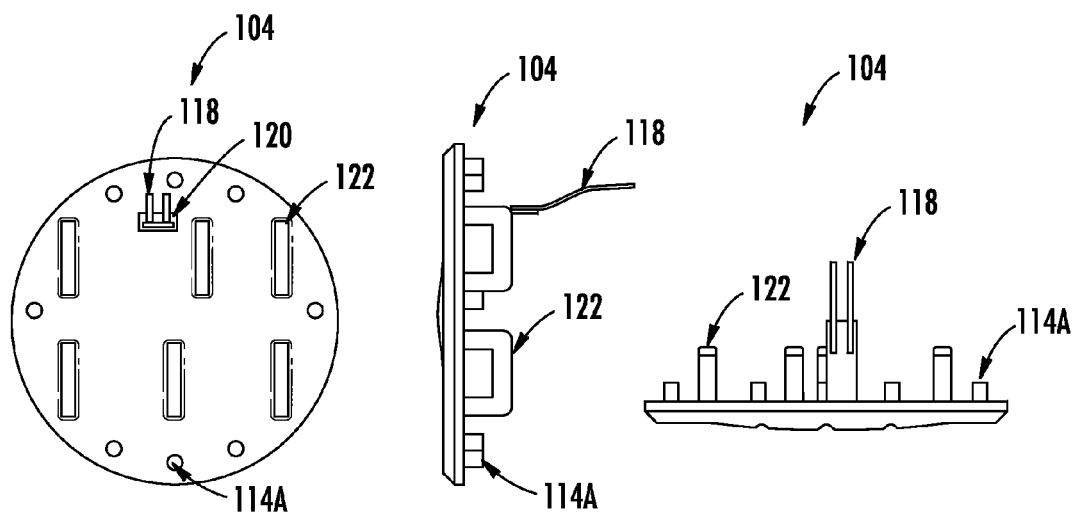
FIG. 4A  FIG. 4B  FIG. 4C

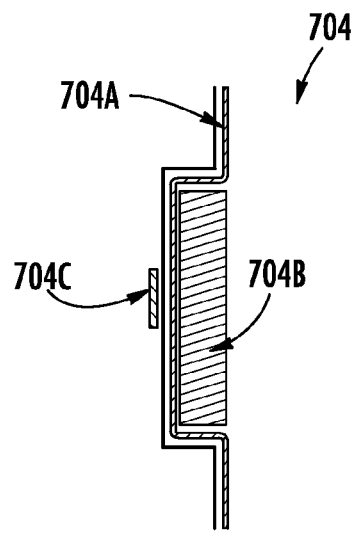
FIG. 11A
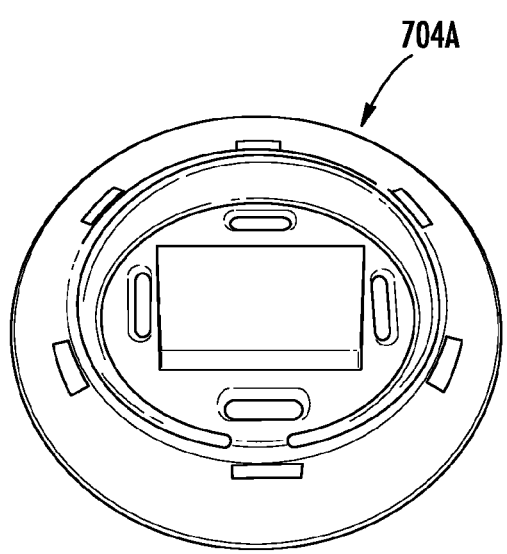 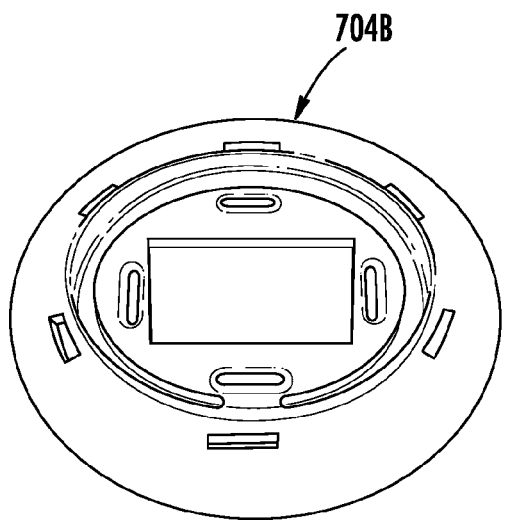
FIG. 11B          FIG. 11C

ILLUMINATED EMBLEM ASSEMBLY FOR CONNECTION TO AN AIRBAG COVER

RELATED APPLICATIONS

This application is a continuation of U.S. patent application Ser. No. 14/167,178, filed Jan. 29, 2014, entitled "ILLUMINATED EMBLEM ASSEMBLY FOR CONNECTION TO AN AIRBAG COVER," which claims priority to U.S. Provisional Patent Application No. 61/757,881, filed Jan. 29, 2013, entitled "ILLUMINATED EMBLEM ASSEMBLY FOR CONNECTION TO AN AIRBAG COVER," both of which are incorporated herein by reference in their entirety.

BACKGROUND

Airbag systems are commonly installed in vehicles. For example, airbag systems are included in many steering wheels. In the event of an accident, the airbag system deploys an airbag to protect the vehicle's occupants from injuries resulting from impact with portions of the vehicle's interior (e.g., the steering wheel). In addition, it is also common to display a logo such as a distinctive design, trademark, etc., for example, of a vehicle manufacturer and/or vehicle brand on the steering wheel. The logo often includes ornamental features and/or a variety of colors. The logo can be provided on an airbag cover, i.e., the portion of the steering wheel that is displaced when the airbag is deployed. It has also become desirable to illuminate or provide backlighting for the logo in order to provide a more distinctive appearance. Providing an illuminated emblem, however, increases the complexity and cost of logo and airbag system.

SUMMARY

Multi-piece constructions for an illuminated emblem assembly for connection to an airbag cover are provided herein. For example, an airbag assembly can include an airbag cover having a front surface and a rear surface, an emblem portion having one or more translucent areas and an illumination source. The airbag cover can also include one or more attachment elements protruding from the rear surface. Additionally, the emblem portion and the illumination source can include one or more openings for accommodating the one or more attachment elements. The illumination source can also include a light guide and one or more light emitting diodes (LEDs), where the one or more LEDs are fitted in one or more recesses formed in the light guide. The emblem portion can be arranged between the airbag cover and the illumination source, and the emblem portion and the illumination source can be aligned such that at least one of the one or more translucent areas is illuminated by light passing through the emblem portion from the illumination source.

Optionally, the airbag cover can include one or more openings for accommodating the emblem portion. Further, the one or more attachment elements can be arranged adjacent to a perimeter of the one or more openings for accommodating the emblem portion. When the airbag cover includes at least two attachment elements, the attachment elements can be arranged in a spaced apart pattern. Optionally, at least one of the one or more LEDs can be fitted in a recess formed in the light guide between two openings for accommodating the attachment elements.

Alternatively or additionally, the airbag cover can include an inner opening for accommodating an inner portion of the emblem portion and an outer opening for accommodating an outer portion of the emblem portion. Further, the airbag cover can include one or more inner attachment elements and one or more outer attachment elements. The inner attachment elements can be arranged in a spaced apart pattern adjacent to a perimeter of the inner opening for accommodating the inner portion of the emblem portion, and the outer attachment elements can be arranged in a spaced apart pattern adjacent to a perimeter of the outer opening for accommodating the outer portion of the emblem portion. Optionally, at least one of the one or more LEDs can be fitted in a recess formed in the light guide between two openings for accommodating the inner attachment elements or the outer attachment elements.

Additionally, the one or more LEDs can be side-emitting LEDs. Optionally, the one or more attachment elements can be deformable studs. In addition, the front surface of the airbag cover can face a vehicle's passenger compartment.

An airbag assembly according to another implementation can include an airbag cover having a front surface and a rear surface. The airbag cover can include an inner opening and an outer opening. The airbag cover can also include one or more inner attachment elements and one or more outer attachment elements, where the inner attachment elements are arranged in a spaced apart pattern adjacent to a perimeter of the inner opening and the outer attachment elements are arranged in a spaced apart pattern adjacent to a perimeter of the outer opening. The airbag assembly can also include an emblem portion having one or more translucent areas and defining an inner portion and an outer portion. The emblem portion can also include one or more openings for accommodating the one or more inner and outer attachment elements. Additionally, the inner portion of the emblem portion is accommodated by the inner opening of the airbag cover, and the outer portion of the emblem portion is accommodated by the outer opening of the airbag cover. The airbag assembly can also include an illumination source having one or more openings for accommodating the one or more inner and outer attachment elements. The illumination source can be an electroluminescent foil. The emblem portion can be arranged between the airbag cover and the illumination source, and the emblem portion and the illumination source can be aligned such that at least one of the one or more translucent areas is illuminated by light passing through the emblem portion from the illumination source.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 3 is an exploded view illustrating the emblem assembly shown in FIG. 2;

FIGS. 4A-4C are rear and side views illustrating the emblem assembly shown in FIG. 2;

FIG. 11A is a cross sectional view illustrating an emblem portion according to implementations discussed herein;

FIG. 11B is a front view illustrating a decorative film of an emblem portion according to implementations discussed herein;

FIG. 11C is a front view of a lens of an emblem portion according to implementations discussed herein;

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. While implementations will be described for providing an illuminated emblem assembly for connection to an airbag assembly, it will become evident to those skilled in the art that the implementations are not limited thereto, but are applicable for providing an illuminated emblem assembly for connection to other components.

Figure 1:
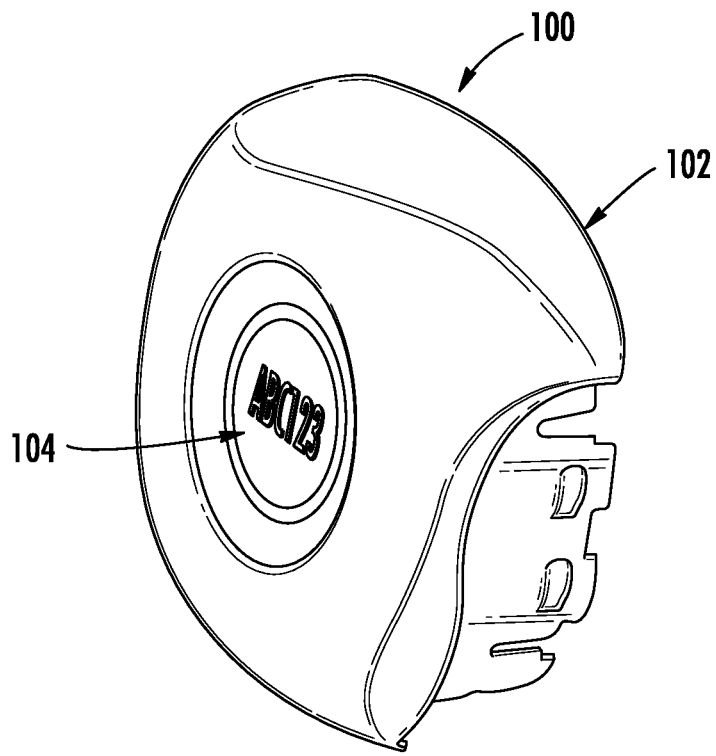
FIG. 1 is a front view illustrating an airbag assembly according to an implementation discussed herein.
Figure 2:
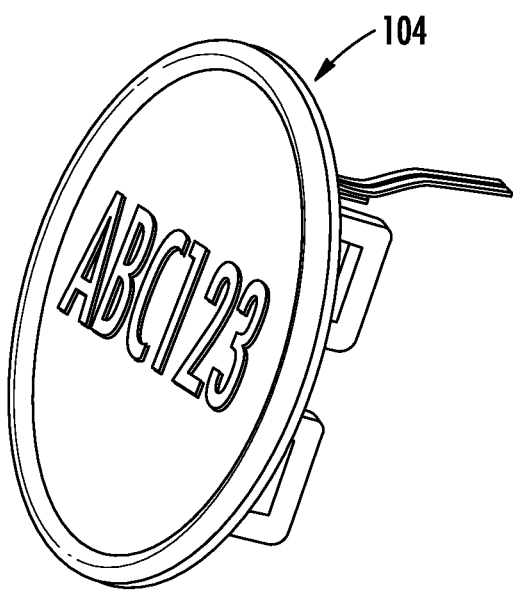
FIG. 2 is a front view illustrating an emblem assembly for connection to the airbag assembly shown in FIG. 1.

Referring now to FIG. 1, an airbag assembly 100 according to an implementation discussed herein is shown. The airbag assembly 100 includes an airbag cover 102 and an emblem assembly 104. It should be understood that the airbag assembly 100 can be used as part of a steering wheel airbag system in a vehicle. The airbag assembly 100 can be connected to the airbag system by any means known in the art. The airbag cover 102 can be used to cover the airbag. When the airbag is deployed, the airbag displaces the airbag cover 102. The emblem assembly 104 can be used to display a logo, design, trademark, etc. of a vehicle manufacturer and/or vehicle brand. In FIG. 1, the emblem assembly 104 displays the logo "ABC123," for example. This disclosure contemplates that the emblem assembly 104 is not limited to displaying the logo "ABC123" and can display any design including, but not limited to, logos, trademarks, etc. of other vehicle manufacturers and/or vehicle brands. As discussed below, at least a portion of the emblem assembly 104 can be illuminated or backlit in order to provide a more distinctive appearance. As shown in FIG. 1, the emblem assembly 104 is connected to a central portion of the airbag cover 102. However, it should be understood that the emblem assembly 104 can be offset from the central portion of the airbag cover 102.

Referring now to FIGS. 2-4C, different views of the emblem assembly 104 are shown. For example, in FIGS. 2 and 3, a front view and an exploded view of the emblem assembly 104, respectively, are shown. The emblem assembly 104 can include a plurality of construction pieces/parts such as an emblem portion 106 (shown by a dotted line), an illumination source 108 and a carrier portion 110. The emblem portion 106 is the visible portion of the emblem assembly 104 when it is installed in the vehicle, for example. The emblem portion 106 optionally includes a decorative film 106A and a lens 106B. The decorative film 106A can display the logo, design, trademark, etc., and the lens 106B can be injection molded urethane, polycarbonate, or other thermoplastic polymer material. The decorative film 106A can be a metal film (e.g., a chrome-plated film) that is screen printed and vacuumed formed to provide its shape. The lens 106B can fill the cavity of the decorative film 106A to provide strength. It should be understood that the decorative film 106A and the lens 106B can be joined by methods including, but not limited to, chemical bonding, in mold decoration, etc. to form the emblem portion 106. The emblem portion 106 can optionally include one or more translucent areas and one or more opaque areas. Alternatively or additionally, the emblem portion 106 can optionally include one or more metalized and/or colored areas. Alternatively or additionally, the emblem portion 106 can optionally include one or more raised and/or recessed (i.e., embossed/debossed) areas to provide 3D features. It should be understood that combinations of transparent, opaque, plated, colored, raised and/or recessed areas can be used to create the logo, trademark, design, etc. Additionally, it should also be understood that the decorative film 106A and the lens 106B can include corresponding translucent/opaque and raised/recessed portions. Alternatively or additionally, the lens 106B can be entirely translucent. For example, as shown in FIG. 3, the emblem portion 106 includes one or more translucent areas 112A and one or more opaque areas 112B. Accordingly, the translucent areas 112A can be illuminated, for example, by the illumination source 108 as discussed below. Optionally, the translucent areas 112A can also be raised/recessed areas and/or colored areas.

The emblem portion 106 can include one or more attachment elements 114. The attachment elements 114 can be used for connecting the emblem portion 106 to the carrier portion 110. The attachment elements 114 can protrude from the lens 106A, for example. In particular, the attachment elements 114 can protrude in a direction away from the decorative film 106A. In addition, the carrier portion 110 can include one or more openings 116 for accommodating the attachment elements 114. For example, the carrier portion 110 can include openings 116 corresponding to each of the attachment elements 114 of the emblem portion 106. Optionally, the illumination source 108 can also include one or more openings for accommodating the attachment elements 114. As shown in FIGS. 3 and 4A, the emblem portion 106 includes eight attachment elements 114, which are arranged in a spaced apart pattern adjacent to a perimeter of the lens 106A, and the carrier portion 110 includes eight corresponding openings 116. The configuration shown in the figures is only provided as an example. It should therefore be understood that greater or fewer attachment elements 114 and corresponding openings 116 can be used to connect the emblem portion 106 and carrier portion 110 depending upon the structural requirements of the assembly. Additionally, it should be understood that the number, size, arrangement, etc. of the attachment elements 114 and corresponding openings 116 can vary based on the design of the emblem portion 106 and the carrier portion 110.

In order to connect the emblem portion 106 to the carrier portion 110, the attachment elements 114 pass through corresponding openings 116. The attachment elements 114 can then be deformed with heat or other energy (e.g., ultrasonic waves). Deforming the attachment elements 114 using heat is a process known as heat staking. The deformed portion (e.g., head) 114A of each of the attachment elements 114 is referred to as a "nugget." The deformed portions 114A mechanically retain or lock the emblem portion 106 and the carrier portion 110. The deformed portions 114A are shown in FIGS. 4A-4C. Alternatively or additionally, this disclosure contemplates that other means for connecting the emblem portion 106 to the carrier portion 110 can be used such as twist lock, snap in, chemical bonding, etc.

The illumination source 108 can be arranged between the emblem portion 106 and the carrier portion 110 as shown in FIG. 3. Optionally, at least one of the emblem portion 106 and the carrier portion 110 can include a recessed area for accommodating the illumination source 108. Accordingly, the emblem portion 106 and the carrier portion 110 sandwich the illumination source 108, which protects the illumination source 108 from damage from the environment. The illumination source 108 is aligned with the emblem portion 106 when arranged between the emblem portion 106 and the carrier portion 110 such that at least one of the one or more translucent areas 112A of the emblem portion 106 is illuminated by light passing through the emblem portion 106 from the illumination source 108. The illumination source 108 can also include one or more electrical conductors 118 for supplying electrical power to the illumination source 108, for example. As shown in FIG. 4A, the carrier portion 110 can include an opening 120 for accommodating the electrical conductors 118. The electrical conductors 118 can therefore be routed from the illumination source 108 into an internal portion of the airbag assembly where it can be mounted and/or connected to a power source by any means known in the art. As discussed below, the illumination source 108 can be a light guide illuminated by one or more LEDs. Alternatively or additionally, the illumination source 108 can be an electroluminescent layer.

Additionally, the carrier portion 110 can optionally include one or more airbag cover attachment elements 122 for connecting the carrier portion 110 to the airbag cover 102. For example, the airbag cover attachment elements 122 can protrude from the carrier portion 110 in a direction away from the emblem portion 106. The airbag cover attachment elements 122 can be shaped to accommodate an elongate connector, which is discussed below. For example, as shown in FIG. 4B, each of the airbag cover attachment elements 122 can form a closed loop such as a loop or bridge for example. Each of the airbag cover attachment elements 122 can therefore secure an elongate connector that is inserted through it.

Figure 5A:
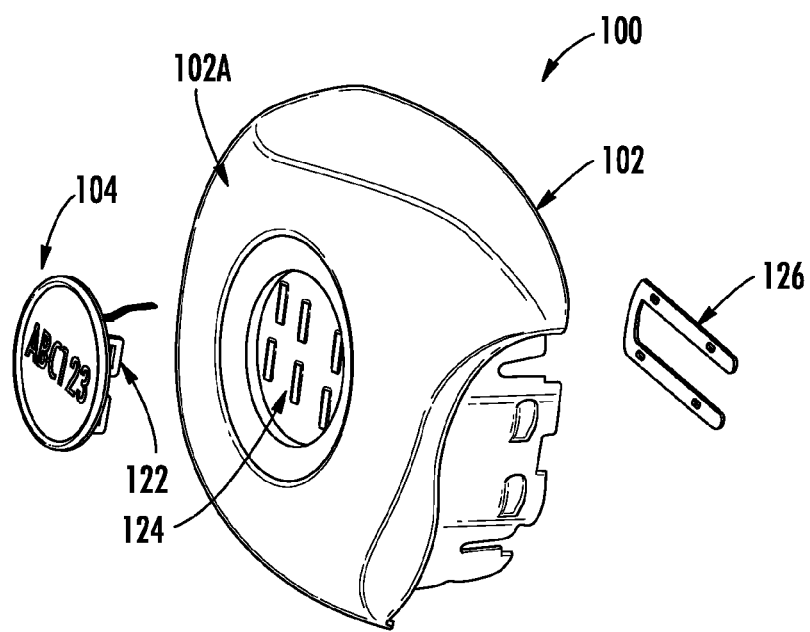
FIG. 5A is an exploded view illustrating the airbag assembly shown in FIG. 1.

Referring now to FIG. 5A, an exploded view illustrating the airbag assembly 100 of FIG. 1 is shown. The airbag cover 102 can include a front surface 102A that faces a vehicle's passenger compartment. The airbag cover 102 can include one or more openings 124 for accommodating the airbag cover attachment elements 122. For example, the airbag cover 102 can include openings 124 corresponding to each of the airbag cover attachment elements 122. Optionally, the airbag cover 102 can also include an opening for accommodating the electrical conductors 118. The emblem assembly 104 can be attached to the front surface 102A of the airbag cover 102 by aligning the airbag cover attachment elements 122 and corresponding openings 124 and then inserting an elongate connector 126 (i.e., a bayonet) through the airbag cover attachment elements 122. By inserting the elongate connector 126 through the airbag cover attachment elements 122, the emblem assembly 104 can be securely fastened to the airbag cover 102. Additionally, the emblem assembly 104 can be disconnected from the airbag cover 102 to provide service, for example, by removing the elongate connector 126.

Figures 5B, 5C:
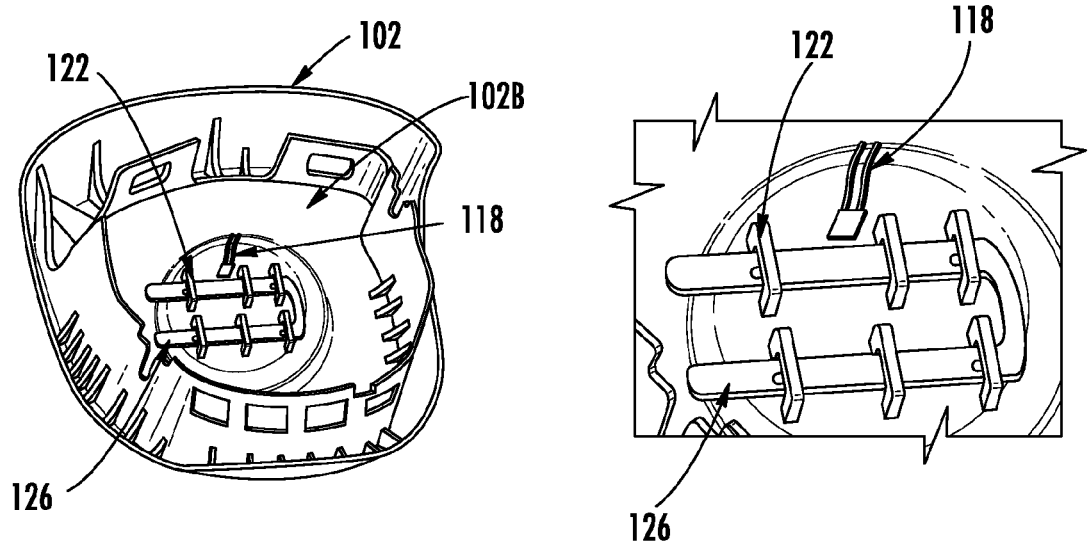
FIGS. 5B-5C are rear views illustrating the airbag assembly shown in FIG. 1.

As discussed above, the emblem assembly 104 can be attached to the airbag cover 102 by aligning the airbag cover attachment elements 122 and corresponding openings 124. Referring now to FIGS. 5B and 5C, rear views illustrating the airbag assembly of FIG. 1 are shown. Specifically, FIGS. 5B and 5C illustrate a rear surface 102B of the airbag cover 102. The airbag cover attachment elements 122 can pass through the corresponding openings of the airbag cover 102 when aligned. The airbag cover attachment elements 122 can be arranged in a spaced apart pattern, for example, corresponding to a shape of the elongate connector 126. For example, as shown in FIGS. 5B and 5C, the airbag cover attachment elements 122 are arranged in a spaced apart pattern to accommodate a two-branch, fork-shaped bayonet. It should be understood that the number, size, shape, location, etc. of the airbag cover attachment elements 122 can vary depending on the size of the emblem assembly. For example, for smaller emblem assemblies, the airbag cover attachment elements can be arranged in a spaced apart pattern to accommodate a single-branch bayonet. The elongate connector 126 can then be inserted through each of the airbag cover attachment elements 122 to secure the emblem assembly as discussed above. Additionally, the airbag cover 102 can include features that match the features of the emblem assembly so that the emblem assembly is flush with the airbag cover when connected. For example, the airbag cover 102 can include an opening to accommodate the electrical conductors 118. Further, the airbag cover 102 can optionally include openings and/or recessed areas to accommodate any protrusions that result from connecting the emblem portion to the carrier portion. In the examples above, nuggets or deformed portions of the attachment elements mechanically fasten the emblem portion to the carrier portion. The airbag cover 102 can therefore include openings and/or recessed areas to accommodate the nuggets.

Figure 6A:
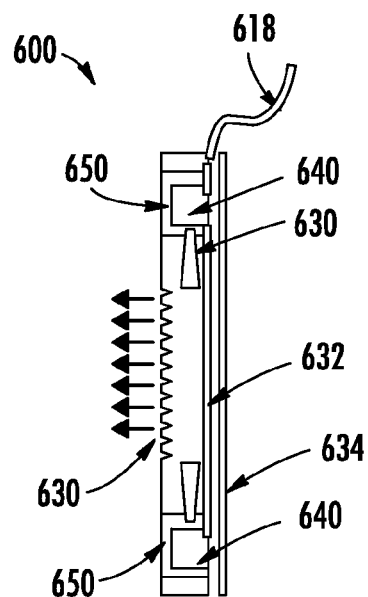
FIG. 6A is a cross sectional view of an illumination source according to implementations discussed herein.

Referring now to FIG. 6A, a cross sectional view of an illumination source 600 is shown. The illumination source 600 can be used in any of the implementations discussed herein. The illumination source 600 can include a light guide 630 and one or more LEDs 640. It should be understood that the light guide 630 can be illuminated by the LEDs 640. The light guide 630 can be molded polycarbonate or other thermoplastic polymer material, for example. Additionally, the light guide 630 can optionally include raised and/or recessed areas (i.e., an etched pattern) 630A. The etched pattern 630A can correspond to translucent areas of the emblem portion to be illuminated by the illumination source, for example. The light guide 630 can also include one or more LED pockets 650 for accommodating the LEDs 640. The LED pockets 650 can be openings or recessed areas in the light guide 630 in which the LEDs 640 can be positioned and secured. For example, the LEDs 640 can be side-emitting LEDs, and the LEDs 640 can be positioned in the LED pockets 650 such that the LEDs 640 illuminate the light guide 630. Additionally, the light guide 630 can also include electrical traces 632 for electrically connecting the LEDs 640. The electrical traces 632 can be screen printed onto the light guide 630, for example. The light guide 630 can also include one or more electrical conductors 618 for supplying electrical power to the LEDs 640. Further, the light guide 630 can include a layer of diffuser ink 634, which can also be screen printed, for example. It should be understood that the light guide 630 can include additional electrical components such as, but not limited to, diodes for electrostatic discharge protection.

Figure 6B:
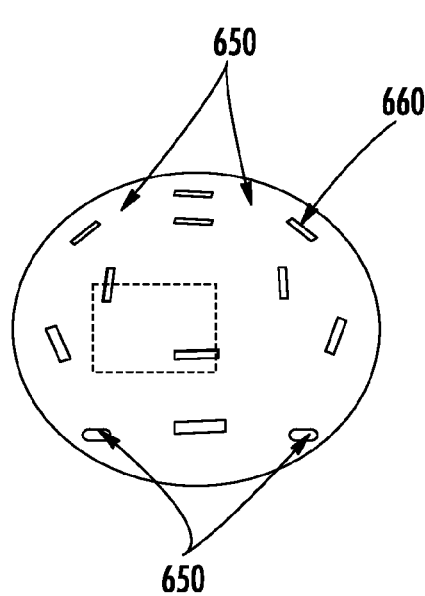
FIGS. 6B-6C are front views illustrating portions of an illumination source according to implementations discussed herein.
Figure 6C:
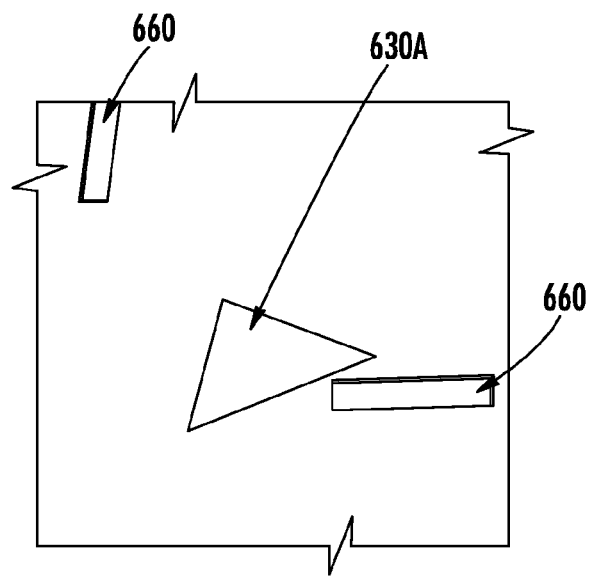

Referring now to FIGS. 6B and 6C, front views illustrating portions of an illumination source are shown. In particular, FIG. 6B illustrates a front view of a light guide, and FIG. 6C illustrates a portion of the light guide surrounded by a dotted line in FIG. 6B. As discussed above, the illumination source can include one or more openings for accommodating the attachment elements that fasten the emblem portion and the carrier portion of the emblem assembly. Accordingly, the light guide 630 can include one or more openings 660 for accommodating attachment elements. Additionally, the light guide 630 can include one or more LED pockets 650 for accommodating one or more LEDs. For example, the LED pockets 650 can be arranged adjacent to a perimeter of the light guide 630. Alternatively or additionally, each of the LED pockets 650 can be arranged between two of the openings 660. Optionally, as discussed above, the light guide 630 can include an etched surface 630A.

Figure 7:
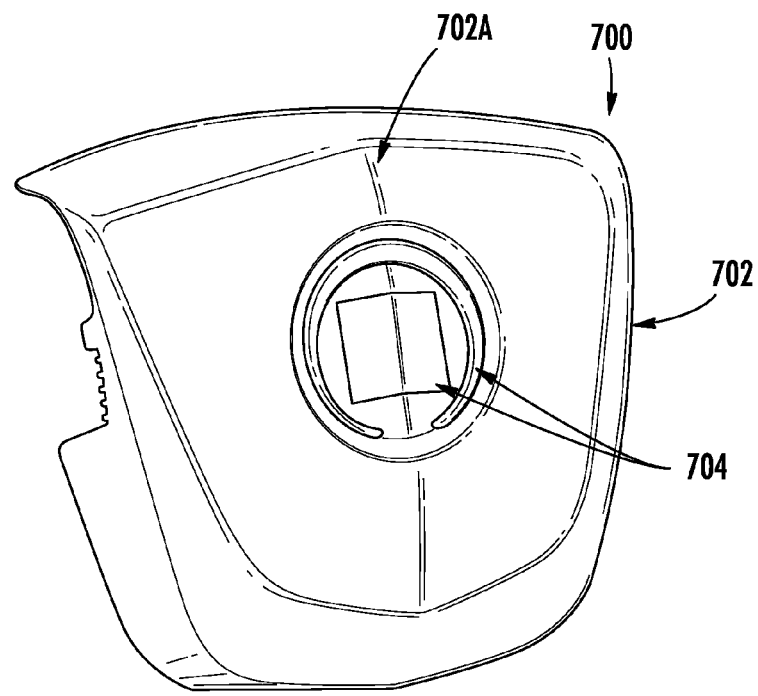
FIG. 7 is a front view illustrating an assembled airbag assembly according to another implementation discussed herein.

Referring now to FIG. 7, an airbag assembly 700 according to another implementation discussed herein is shown. The airbag assembly 700 includes an airbag cover 702 and an emblem portion 704. The airbag cover 702 can have a front surface 702A that faces a vehicle's passenger compartment. It should be understood that the airbag assembly 700 can be used as part of a steering wheel airbag system in a vehicle as discussed above. The emblem portion 704 can be used to display a logo, design, trademark, etc. of a vehicle manufacturer and/or vehicle brand. In FIG. 7, the emblem portion 704 displays a shaped logo, for example. Similarly to above, at least a portion of the emblem portion 704 can be illuminated or backlit in order to provide a more distinctive appearance.

Figure 8:
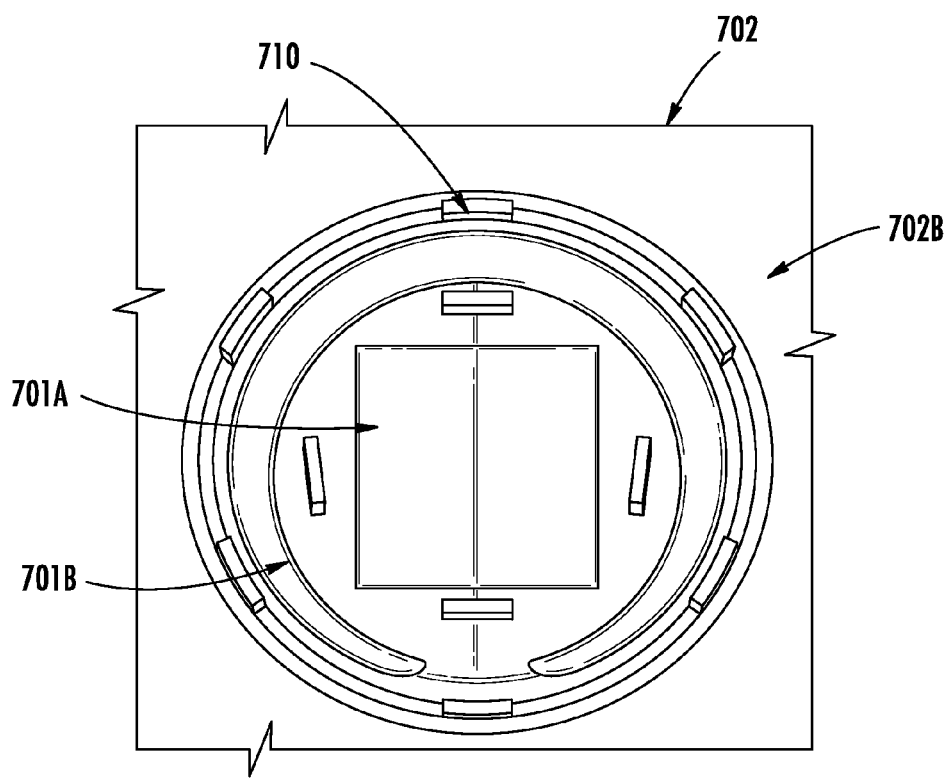
FIG. 8 is a rear view illustrating a portion of the airbag assembly shown in FIG. 7.

Referring now to FIG. 8, a rear view of a portion of the airbag assembly is shown. The airbag cover 702 can include one or more attachment elements 710 for connecting the emblem portion to the airbag cover 702. The attachment elements 710 can protrude from a rear surface 702B of the airbag cover 702, for example. The attachment elements 710 can be deformable studs, which are discussed in detail above. In FIG. 8, the airbag cover 702 includes one or more openings 701A, 701B for accommodating the emblem portion. For example, the emblem portion can be connected from the rear surface 702B of the airbag cover 702, and an inner opening 701A accommodates an inner portion of the emblem portion while an outer opening 701B accommodates an outer portion of the emblem portion. It should be understood that the airbag cover 702 can include more or less openings depending on the design of the emblem portion. Similarly to above, the attachment elements 710 can be arranged in a spaced apart pattern adjacent a perimeter of one or more of the openings 701A, 701B. In FIG. 8, a plurality of attachment elements 710 are arranged adjacent to a perimeter of the inner opening 701A, and a plurality of attachment elements 714 are arranged adjacent to a perimeter of the outer opening 701B. It should be understood that the number, size, position, etc. of the attachment elements 710 are variable based on the design of the emblem portion.

Figure 9:
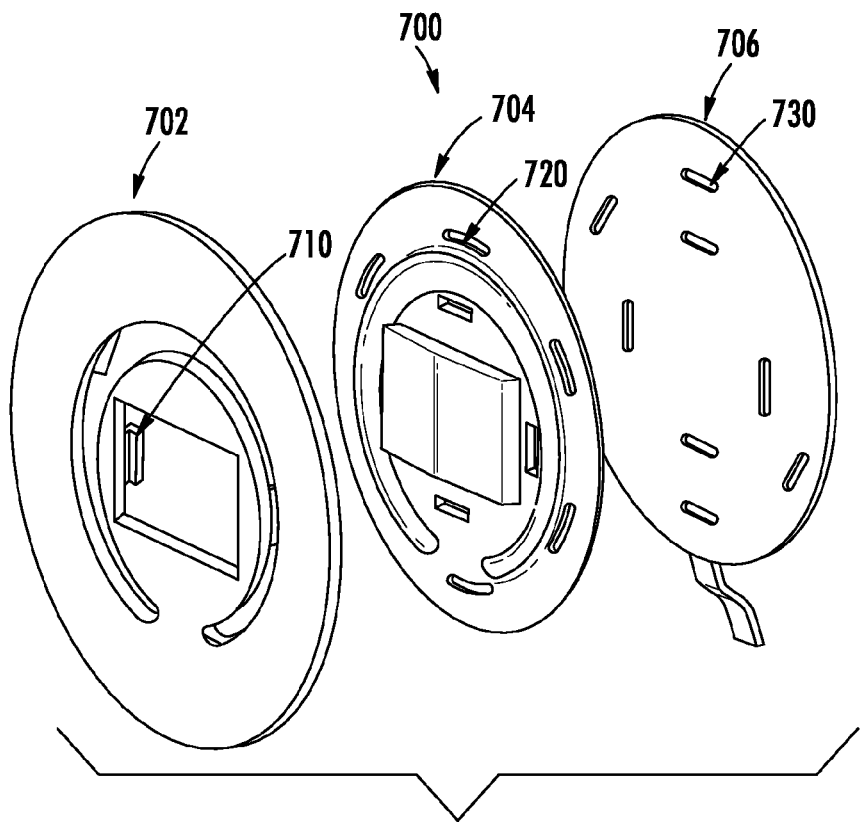
FIG. 9 is an exploded view illustrating the airbag assembly shown in FIG. 7.

Referring now to FIG. 9, an exploded view illustrating the airbag assembly 700 is shown. The airbag assembly 700 includes the airbag cover 702, the emblem portion 704 and an illumination source 706. It should be understood that the emblem portion 704 can have features similar to those discussed above with regard to FIGS. 3-4C. Alternatively or additionally, the emblem portion 704 can have features discussed below with regard to FIGS. 11A-11C. In addition, the illumination source 706 can be the illumination source 600 discussed above with regard to FIGS. 6A-6C. Alternatively or additionally, the illumination source 706 can be an electroluminescent film.

Figure 10:
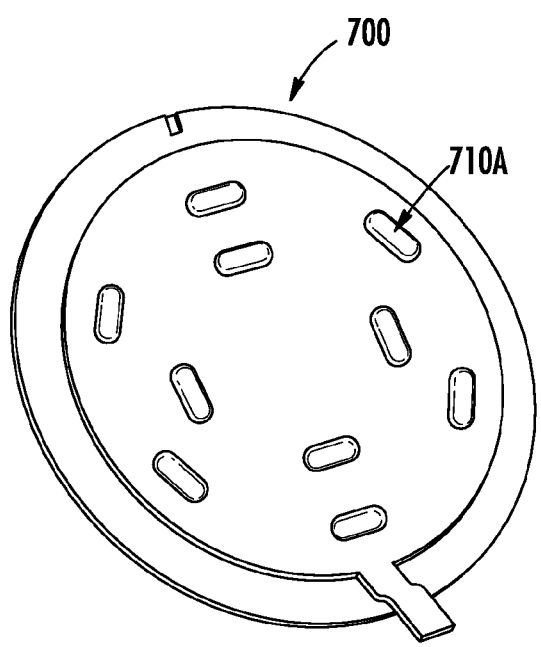
FIG. 10 is a rear view illustrating the emblem assembly shown in FIG. 9.

As shown in FIG. 9, the emblem portion 704 can include one or more openings 720 for accommodating the attachment elements 710. For example, the emblem portion 704 can include an opening 720 corresponding to each of the attachment elements 710. Additionally, the illumination source 706 can include one or more openings 730 for accommodating the attachment elements 710. For example, the illumination source 706 can include an opening 730 corresponding to each of the attachment elements 710. The attachment elements 710 can pass through corresponding openings 720 of the emblem portion 704 and corresponding openings 730 of the illumination source 706. The attachment elements 710 can then be deformed with heat or other energy (e.g., ultrasonic waves). The deformed portions of the attachment elements (i.e., "nuggets") mechanically retain or lock the airbag cover 702, the emblem portion 704 and the illumination source 706. The deformed portions 710A are shown in FIG. 10, which is a rear view of the airbag assembly 700. Accordingly, the emblem portion 704 can be arranged between the airbag cover 702 and the illumination source 706 such that the emblem portion 704 and the illumination source 706 are aligned. At least one translucent area of the emblem portion 704 can therefore be illuminated by light passing through the emblem portion 704 from the illumination source 706.

Referring now to FIG. 11A, a cross sectional view illustrating an emblem portion 704 is shown. The emblem portion 704 is visible when it is installed in the vehicle, for example. The emblem portion 704 optionally includes a decorative film 704A and a lens 704B. Optionally, the emblem portion 704 can include ink 704C printed on the decorative film 704A. The decorative film 704A can display the logo, design, trademark, etc., and the lens 704B can be injection molded urethane, polycarbonate, or other thermoplastic polymer material. The decorative film 704A can be a metal film (e.g., a chrome-plated film) that is screen printed and vacuumed formed to provide its shape. The lens 704B can fill the cavity of the decorative film 704A to provide strength. It should be understood that the decorative film 704A and the lens 704B can be joined by methods including, but not limited to, chemical bonding, in mold decoration, etc. to form the emblem portion 704. The decorative film 704A is shown in FIG. 11B, and the lens 704B is shown in FIG. 11C. The emblem portion 704 can optionally include one or more translucent areas and one or more opaque areas. Alternatively or additionally, the emblem portion 704 can optionally include one or more metalized plated and/or colored areas. Alternatively or additionally, the emblem portion 704 can optionally include one or more raised and/or recessed (i.e., embossed/debossed) areas to provide 3D features. It should be understood that combinations of transparent, opaque, plated, colored, raised and/or recessed areas can be used to create the logo, trademark, design, etc. Additionally, it should also be understood that the decorative film 704A and the lens 704B can include corresponding translucent/opaque and raised/recessed portions. Alternatively or additionally, the lens 704B can be entirely translucent. Accordingly, the translucent areas can be illuminated, for example, by the illumination source 706 as discussed above. Optionally, the translucent areas can also be raised/recessed areas and/or colored areas.

Figure 12A:
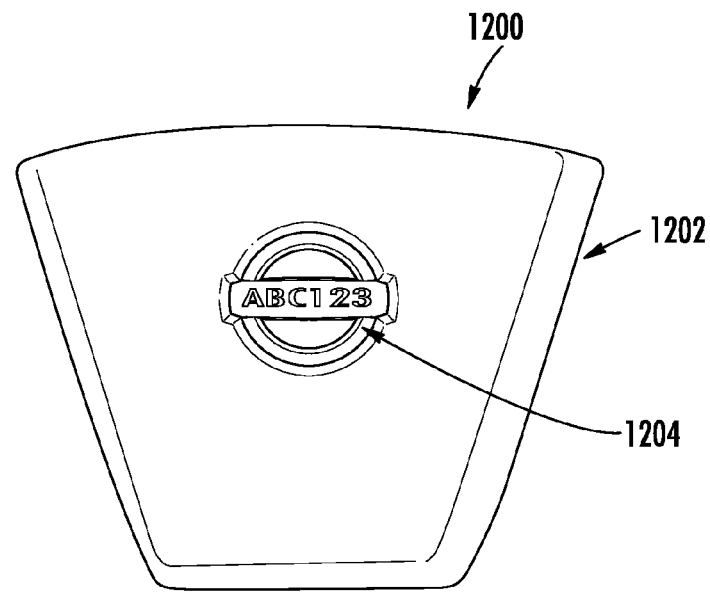
FIG. 12A is a front view illustrating an assembled airbag assembly according to another implementation discussed herein.

Referring now to FIG. 12A, an airbag assembly 1200 according to another implementation discussed herein is shown. The airbag assembly 1200 includes an airbag cover 1202 and an emblem portion 1204. The airbag assembly 1200 shares many of the same features of the airbag assembly discussed above with regard to FIGS. 7-11C, and therefore, the similar features are not discussed in detail below. Similarly to above, the emblem portion 1204 can be used to display a logo, design, trademark, etc. of a vehicle manufacturer and/or vehicle brand. In FIG. 12, the emblem portion 1204 displays the logo "ABC123," for example. Similarly to above, at least a portion of the emblem portion 1204 can be illuminated or backlit in order to provide a more distinctive appearance.

Figure 12B:
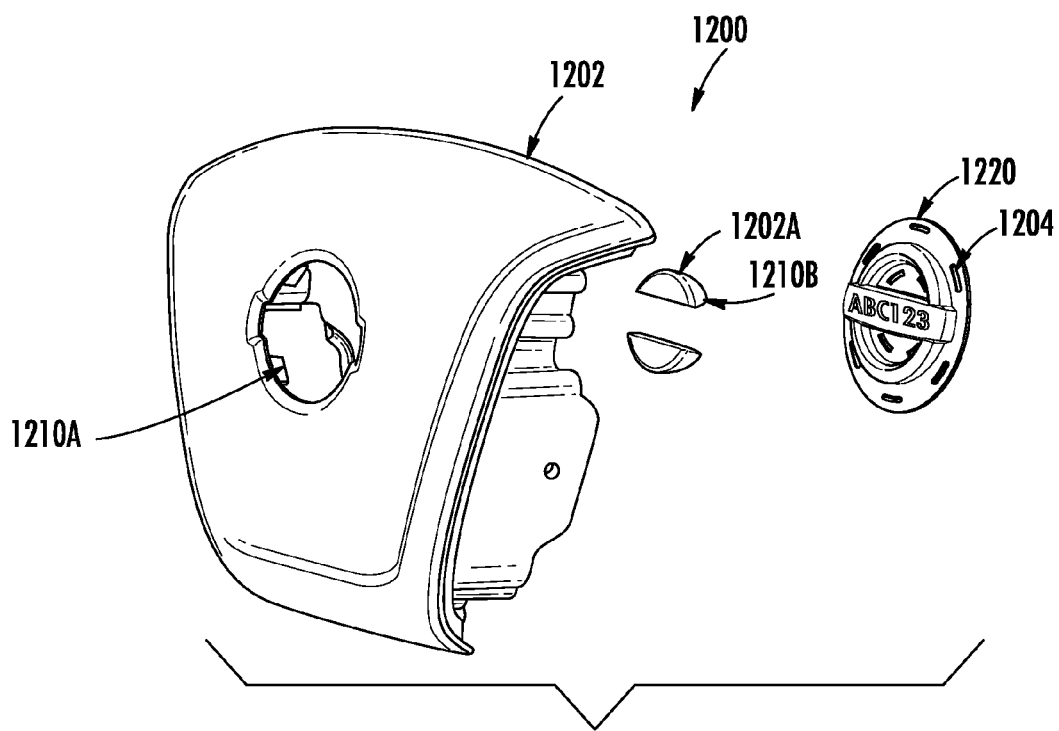
FIG. 12B is an exploded view illustrating the airbag assembly shown in FIG. 12A.

Referring now to FIG. 12B, an exploded view illustrating the airbag assembly is shown. The airbag cover 1202 includes a detachable portion 1202A. Additionally, the airbag cover 1202 includes one or more attachment elements 1210A, and the detachable portion 1202A includes one or more attachment elements 1210B. The emblem portion 1204 includes one or more openings 1220 for accommodating the attachment elements 1210A, 1210B. For example, the emblem portion 1204 includes an opening 1220 for accommodating each of the attachment elements 1210A, 1210B. Although not shown, an illumination source for illuminating the emblem portion 1204 can be provided, and the illumination source can also optionally include one or more openings for accommodating the attachment elements 1210A, 1210B. Similarly to above, the attachment elements 1210A, 1210B can pass through the corresponding openings of the emblem portion 1204. Then, the attachment elements 1210A, 1210B can be deformed to mechanically lock the airbag cover 1202 and the detachable portion 1202A to the emblem portion 1204.

The implementations discussed herein provide a number of advantages. For example, the emblem assemblies and/or airbag assemblies include multiple construction pieces/parts. The pieces/parts can be secured in a non-permanent manner, for example, using an elongate connector such as a bayonet. By securing the pieces/parts in a non-permanent manner, it is possible to service the illuminated emblem assembly more easily. Illuminated emblem assemblies are more expensive than non-illuminated counterparts. If during production a partially assembled airbag cover (e.g., airbag cover and emblem assembly) is damaged, then the emblem assembly can be removed before repairing the airbag cover. In contrast, if the emblem assembly is permanently attached to the airbag cover, the emblem assembly may get damaged while repairing the airbag cover, which results in a loss of the airbag cover and the emblem assembly. Additionally, the illumination source can be sandwiched between the emblem portion and the carrier portion, which protects the illumination source from damage from the environment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An airbag assembly, comprising:
an airbag cover;
an emblem portion including a lens and a decorative film coupled to the lens, wherein the decorative film is vacuum molded into a shape, and a surface of the lens coupled to the decorative film has the same shape as the decorative film, the emblem portion having one or more translucent areas and one or more opaque areas, the one or more opaque areas being formed by an opaque material disposed on a portion of the film; and
an illumination source comprising a light guide and one or more light emitting diodes (LEDs) for illuminating the light guide, the light guide including an illuminated portion for transmitting light emitted from the one or more LEDs,
wherein the emblem portion is arranged between the airbag cover and the illumination source such that the lens is disposed between the decorative film and the illumination source, the emblem portion and the illumination source being aligned such that at least one of the one or more translucent areas is illuminated by light passing through the emblem portion from the illuminated portion, and the one or more opaque areas are not illuminated.

2. The airbag assembly of claim 1, wherein the illuminated portion of the illumination source includes at least one of a raised portion or a recessed portion.

3. The airbag assembly of claim 1, wherein the illuminated portion includes an etched portion.

4. The airbag assembly of claim 1, wherein the one or more LEDs are fitted in one or more recesses formed in the light guide.

5. The airbag assembly of claim 4, wherein the one or more recesses located adjacent to a perimeter of the light guide.

6. The airbag assembly of claim 1, wherein the light guide includes an electrical trace for electrically coupling the one or more LEDs.

7. The airbag assembly of claim 6, where the electrical trace is screen printed onto the light guide.

8. The airbag assembly of claim 1, the light guide includes an electrical conductor for supplying electrical power to the one or more LEDs.

9. The airbag assembly of claim 1, wherein the airbag cover has a front surface and a rear surface and includes one or more attachment elements protruding from the rear surface;
wherein the emblem portion further comprises one or more openings for accommodating the one or more attachment elements;
wherein the illumination source includes one or more openings for accommodating the one or more attachment elements.

10. The airbag assembly of claim 9, wherein the airbag cover comprises one or more openings for accommodating at least a portion of the one or more translucent areas of the emblem portion.

11. The airbag assembly of claim 10, wherein the one or more attachment elements are arranged adjacent to a perimeter of the one or more openings for accommodating at least a portion of the one or more translucent areas of the emblem portion.

12. The airbag assembly of claim 1, wherein the opaque material comprises an opaque ink.

13. An airbag assembly, comprising:
an airbag cover having a front surface and a rear surface and defining an opening,
an emblem portion including a lens and a decorative film coupled to the lens, wherein the decorative film is vacuum molded into a shape, and a surface of the lens coupled to the decorative film has the same shape as the decorative film, the emblem portion including at least one translucent area and at least one opaque area, the opaque area being formed by an opaque material disposed on a portion of the film, where at least a portion of the translucent area and the opaque area extend into the opening provided in the airbag cover; and
an illumination source,
wherein the emblem portion is arranged between the airbag cover and the illumination source, the emblem portion and the illumination source being aligned such that the translucent area is illuminated by light passing through the emblem portion from the illumination source, and the opaque area is not illuminated.

14. The airbag assembly of claim 13, wherein the airbag cover includes at least two openings and the emblem portion includes at least two translucent areas extending into a corresponding one of the at least two openings.

15. The airbag assembly of claim 13, wherein the airbag cover includes one or more attachment elements arranged adjacent to a perimeter of a first opening and one or more attachment elements arranged adjacent to a perimeter of a second opening;
wherein the emblem portion includes one or more openings for accommodating the one or more attachment elements arranged adjacent to the perimeters of the first and second openings,
wherein the illumination source includes one or more openings for accommodating the one or more attachment elements arranged adjacent to the perimeters of the first and second openings.

16. The airbag assembly of claim 13, wherein the illumination source comprises an electroluminescent foil.

17. The airbag assembly of claim 13, wherein a portion of the translucent area of the emblem portion extending into the opening provided in the airbag cover includes at least one of a raised element and a recessed element providing a three-dimensional surface feature to the corresponding translucent area.

18. The airbag assembly of claim 13, wherein at least a portion of the lens includes a thermoplastic polymer material.

* * * * *